(12) United States Patent
Roberts et al.

(10) Patent No.: US 9,479,844 B2
(45) Date of Patent: Oct. 25, 2016

(54) APPARATUS AND METHOD FOR TAGGING MEDIA CONTENT AND MANAGING MARKETING

(71) Applicant: AT&T INTELLECTUAL PROPERTY I, LP, Atlanta, GA (US)

(72) Inventors: Linda Roberts, Boynton Beach, FL (US); E-Lee Chang, Mabelton, GA (US); Ja-Young Sung, San Jose, CA (US); Natasha Barrett Schultz, Suwanee, GA (US); Robert King, Roswell, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 14/743,244

(22) Filed: Jun. 18, 2015

(65) Prior Publication Data
US 2015/0289030 A1 Oct. 8, 2015

Related U.S. Application Data

(63) Continuation of application No. 12/631,613, filed on Dec. 4, 2009, now Pat. No. 9,094,726.

(51) Int. Cl.
*H04N 7/10* (2006.01)
*H04N 7/025* (2006.01)
(Continued)

(52) U.S. Cl.
CPC ............ *H04N 21/812* (2013.01); *G06Q 30/02* (2013.01); *G06Q 30/0243* (2013.01); *G06Q 30/0266* (2013.01); *H04N 21/435* (2013.01);
(Continued)

(58) Field of Classification Search
CPC ...................... H04N 21/4782; H04N 21/4788; H04N 21/6543; H04N 21/812; H04N 21/84; H04N 21/44012

USPC .......... 725/32, 36, 100, 131, 135, 139, 151; 715/751, 758, 808
See application file for complete search history.

(56) References Cited

U.S. PATENT DOCUMENTS

| 5,223,924 A | 6/1993 | Strubbe |
| 5,920,694 A | 7/1999 | Carleton |

(Continued)

OTHER PUBLICATIONS

"Dynamic Integration of Advertising and Digital Video Content", U.S. Appl. No. 61/184,274, filed Jun. 4, 2009.

(Continued)

*Primary Examiner* — Yassin Alata
(74) *Attorney, Agent, or Firm* — Guntin & Gust, PLC; Douglas Schnabel

(57) ABSTRACT

A method that incorporates teachings of the present disclosure may include, for example, transmitting media content to a group of set top boxes for presentation with an overlay superimposed onto the media content, where the overlay can include a timeline corresponding to the presentation of the media content and receiving a first comment from a first set top box of the group of set top boxes, where the first comment is presentable with the overlay and the media content by the group of set top boxes. Additional steps can include receiving a tag generated at a first set top box during presentation of the media content, presenting the tag while the media content is presented, correlating the tag to a portion of the media content timeline and analyzing metadata associated with the portion of the timeline that is tagged to determine a first marketing parameter. Other embodiments are disclosed.

20 Claims, 12 Drawing Sheets

(51) Int. Cl.

| | | |
|---|---|---|
| *H04N 21/81* | (2011.01) | |
| *G06Q 30/02* | (2012.01) | |
| *H04N 21/44* | (2011.01) | |
| *H04N 21/4788* | (2011.01) | |
| *H04N 21/6543* | (2011.01) | |
| *H04N 21/84* | (2011.01) | |
| *H04N 21/435* | (2011.01) | |

(52) U.S. Cl.
CPC .... *H04N21/44012* (2013.01); *H04N 21/4788* (2013.01); *H04N 21/6543* (2013.01); *H04N 21/84* (2013.01)

(56) References Cited

U.S. PATENT DOCUMENTS

| | | |
|---|---|---|
| 6,272,231 B1 | 8/2001 | Maurer |
| 6,357,042 B2 | 3/2002 | Srinivasan |
| 6,438,579 B1 | 8/2002 | Hosken |
| 6,567,797 B1 | 5/2003 | Schuetze |
| 6,580,811 B2 | 6/2003 | Maurer |
| 6,732,146 B1 | 5/2004 | Miyake |
| 6,792,412 B1 | 9/2004 | Sullivan |
| 6,948,131 B1 | 9/2005 | Neven |
| 7,031,931 B1 | 4/2006 | Meyers |
| 7,051,352 B1 | 5/2006 | Schaffer |
| 2002/0010759 A1 | 1/2002 | Hitson |
| 2002/0059094 A1 | 5/2002 | Hosea |
| 2002/0097265 A1 | 7/2002 | Kurapati |
| 2002/0162107 A1 | 10/2002 | Gutta |
| 2002/0178057 A1 | 11/2002 | Bertram |
| 2002/0193066 A1 | 12/2002 | Connelly |
| 2002/0194586 A1 | 12/2002 | Gutta |
| 2002/0199194 A1 | 12/2002 | Ali |
| 2003/0066068 A1 | 4/2003 | Gutta |
| 2003/0101450 A1 | 5/2003 | Davidsson |
| 2003/0234805 A1 | 12/2003 | Toyama |
| 2004/0003392 A1 | 1/2004 | Trajkovic |
| 2004/0014454 A1 | 1/2004 | Burgess |
| 2004/0059625 A1 | 3/2004 | Schrader |
| 2004/0064526 A1 | 4/2004 | Lee |
| 2005/0132401 A1 | 6/2005 | Boccon-Gibod |
| 2005/0144632 A1 | 6/2005 | Mears |
| 2005/0149974 A1 | 7/2005 | Norman |
| 2006/0020614 A1 | 1/2006 | Kolawa |
| 2006/0026502 A1 | 2/2006 | Dutta |
| 2006/0168150 A1 | 7/2006 | Naik |
| 2006/0190966 A1 | 8/2006 | McKissick |
| 2006/0218481 A1 | 9/2006 | Adams Jr. |
| 2006/0259355 A1 | 11/2006 | Farouki |
| 2006/0271997 A1 | 11/2006 | Jacoby |
| 2006/0288041 A1 | 12/2006 | Plastina |
| 2007/0011039 A1 | 1/2007 | Oddo |
| 2007/0033531 A1 | 2/2007 | Marsh |
| 2007/0266304 A1 | 11/2007 | Fletcher et al. |
| 2008/0036917 A1 | 2/2008 | Pascarella et al. |
| 2008/0148320 A1 | 6/2008 | Howcroft |
| 2009/0083788 A1 | 3/2009 | Russell |
| 2010/0095326 A1 | 4/2010 | Robertson, III |
| 2011/0112915 A1 | 5/2011 | Geer, III et al. |

OTHER PUBLICATIONS http://www.chrisharrison.net/projects/collaboratv/CollaboraTV_Harrison.pdf, 2008.

Chorianopoulos, "Content-Enriched Communication—Supporting the Social Uses of TV", 10-page article, The Journal of the Communications Network, vol. 6, Part 1, Jan.-Mar. 2007, 10 pages.

Coppens, "AmigoTV: Towards a Social TV Experience", Alcatel Bell R&I Residential Networked Applications, 4-page article, Apr. 1, 2004.

Georgia Tech, "Avatar Theater—Experimental TV Lab at Georgia Lab", 2-page article, http://etv.gatech.edu/ projects/avatar-theater/, web site last visited Jan. 20, 2010.

Khadraoui, "Interactive TV Show Based on Avatars", IEEE: Systems Communications, 2005, Proceedings, Aug. 17, 2005, pp. 192-197.

"Telebuddies: Social Stitching with Interactive Television", Hasselt University—Transnationale Universiteit Limburg, Belgium, 6-page article, CHI 2006, Apr. 22-27, 2006.

Mukesh, Nathan et al., "CollaboraTV: Making Television Viewing Social Again", Oct. 22, 2008, 15.

Oehlberg, "Designing for Distributed, Sociable Television Viewing", Stanford University, Mechanical Engineering, Palo Alto Research Center, 10-page article, May 2006.

Weisz, , "Watching Together: Integrating Text Chat with Video", Carnegie Mellon University/University of Minnesota, 1O-page article, CHI 2007, Apr. 28-May 3, 2007.

Www.youtube.com, "Netflix Party on XBox Live", 3-page article, http://www.youtube.com/watch? v=_FuPxEC8Tfc&feature=related, web site last visited Jan. 20, 2010.

Www.youtube.com, "NXE Dashboard, Aug. 11th Update Preview Program—Netflix Party", 2-page article, http://www.youtube.com/watch?v=2brb-gCt2ss, web site last visited Jan. 20, 2010.

500

600

700

800

900

1000

1100

1200

1300

APPARATUS AND METHOD FOR TAGGING MEDIA CONTENT AND MANAGING MARKETING

CROSS-REFERENCE TO RELATED APPLICATIONS

This application is a continuation of U.S. patent application Ser. No. 12/631,613, filed Dec. 4, 2009, which is incorporated herein by reference in its entirety.

FIELD OF THE DISCLOSURE

The present disclosure relates generally to marketing and more specifically to an apparatus and method for managing marketing.

BACKGROUND

Effective marketing campaigns often rely upon a strong understanding of the audience to which they are directed. Surveys, demographic data and the like can be used by marketing personnel in their efforts to sell or otherwise market their products and services. In media programming, advertisement selection is often based upon the time of day (for example prime time) or the expected number of viewers.

DETAILED DESCRIPTION

Figure 1:
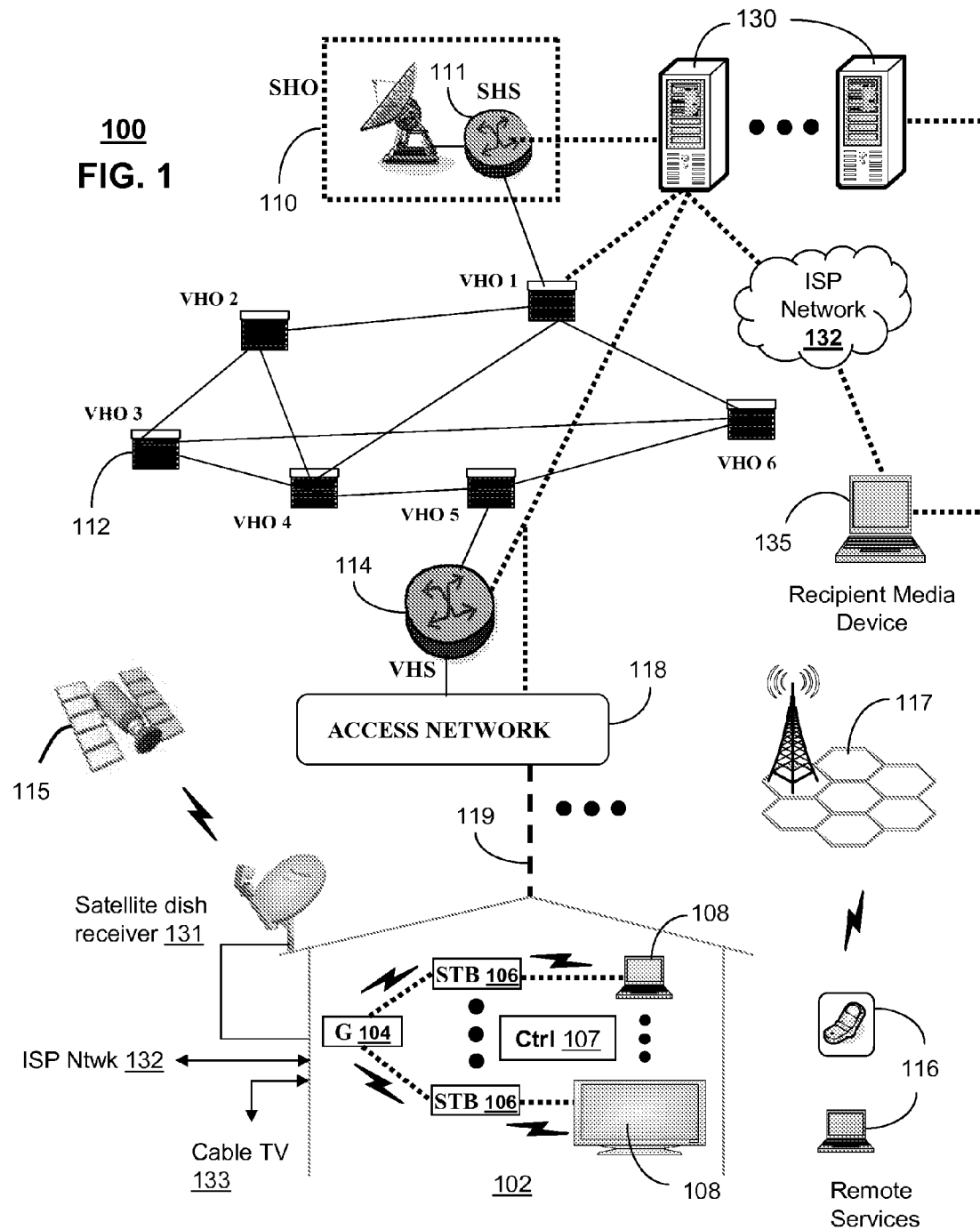
FIGS. 1-2 depict illustrative embodiments of communication systems that provide media services.

The present application is related to U.S. application Ser. No. 12/146,131, filed Jun. 25, 2008 by Amiento et al., entitled "Method and apparatus for presenting media programs," which is incorporated by reference herein in its entirety.

One embodiment of the present disclosure can entail a server having controller to transmit media programming to a group of set top boxes for presentation with an overlay superimposed onto the media programming, where the overlay includes a timeline corresponding to the presentation of the media programming and receive a first comment generated at a first set top box of the group of set top boxes during presentation of the media programming. Further, the controller can receive a tag generated at a first set top box during presentation of the media programming and the tag can be correlated to a portion of a media programming timeline. Alternatively or in a further arrangement, the controller can also receive a second comment generated at a second set top box of the group of set top boxes during presentation of the media programming, where the first and second comments can be associated with the media programming and be presentable in the overlay during presentation of the media programming.

Another embodiment of the present disclosure can be a method including transmitting media content to a group of set top boxes for presentation with an overlay superimposed onto the media content, where the overlay including a timeline corresponding to the presentation of the media content and receiving a first comment from a first set top box of the group of set top boxes, where the first comment is presentable with the overlay and the media content by the group of set top boxes. The method can also include receiving a tag generated at a first set top box during presentation of the media content, correlating the tag to a portion of the media content timeline and analyzing metadata associated with the portion of the media content timeline that is tagged to determine a first marketing parameter.

Yet another embodiment of the present disclosure can entail a non-transitory computer readable storage medium operating in a first set top box of a group of set top boxes, the non-transitory storage medium being embedded with computer instructions to present media content, present at the first set top box an overlay superimposed onto the media content, where the overlay includes a timeline corresponding to the presentation of the media content and the overlay is presentable by a second set top box of the group of set top boxes. The computer instructions can also receive an input of a first comment at the first set top box, where the first comment is presentable by the overlay by the second set top box, receive a tag generated at the first set top box during presentation of the media content, correlate the tag to a portion of the media content time line and analyze metadata associated with the portion of the media content timeline that is tagged to determine a first marketing parameter. Other embodiments and alternative configurations of the embodiments above are described herein.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

The first communication system 100 can also include a recipient media device 135. The recipient media device 135 can be configured to operate in an iTV network, which can include, but is not limited to including, IPTV, interactive cable television, and interactive satellite television. Additionally, the recipient media device 135 can be communicatively linked to the ISP network 132, the one or more computing devices 130, and to other devices in the system 100. Furthermore, the recipient media device 135 can be a STB, mobile device, personal computer, telephone, personal digital assistant (PDA), or other device capable of requesting, receiving, and transmitting media content.

Operatively, the recipient media device 135 can be configured to transmit a request for media content or media programming, as well as user-generated comments associated with the media content or media programming. The recipient media device 135 can also be configured to transmit a request to tag a portion of the media programming timeline or media content runtime with a public or private tag, or a tag that is displayed to particular other users at other set top boxes. The tag is correlated to the point in time or a period in time during the program timeline and at which the tag was requested. As set forth below, the correlation of the tag to the timeline can be visually seen by locating the tag along the appropriate timeline when displayed to the user.

The tag can be a reminder tag, an ecommerce tag, an audio and/or video tag, a product or service tag or a general commentary tag. For instance, the reminder tag can be a reminder related to the timing of a scene from a television show or the like to help a user remember to discuss a particular portion of a show with friends. The audio tag can be related to audio content, such as a song, that is playing at the point in the timeline at which the tag is requested. A product or service tag can be related to one or more products or services that are displayed at the point in the timeline at which the tag or requested. An ecommerce tag can be related to other forms of commerce, such as ecommerce websites to purchase products or services displayed with the media contact, websites dedicated to information regarding or services related to traveling to a location shown in media content, while general commentary tags can be used for user or community commentary with respect to the content at the point in the timeline at which the tag is requested.

The media content can be video content, audio content, still image content, text content, and other types of content. For example, the content can be previews for audio and video content, advertisements (a first advertisement, a second advertisement, etc.), and promotional content. Additionally, the media content or media programming can also include metadata regarding the media content or media programming, such as the creation date, version or series number, title, director, actors, summary of the contents, length of the recording, critical rating, file features or characteristics and the data and source of the content. Other metadata can include other informational data regarding the displayed or presented content, such as data regarding the products and services presented in media content, musical recordings, ecommerce sites where such products and services can be purchased, promotional information or offers regarding the same and other contextual information. Metadata of the media content can be relevant to the time at which a tag is received.

The various devices in the system 100 can be configured to relay and/or receive the requests from the recipient media device 135. Such devices can include, but are not limited to including, the computing devices 130, the STBs 106, media devices 108, and wireless communications device 116. The recipient media device 135 can be also be configured to receive requests for media content, user-generated comments and tags associated with the media content that is received at the recipient media device 135. Once the requests are received, the recipient media device 135 can relay the media content, tags and/or the user-generated comments to the requesting devices.

Another distinct portion of the computing devices 130 can function as a server (herein referred to as server 130). The server 130 can use common computing and communication technology to perform the function of receiving and processing media content or media programming, tags, user-generated comments, and data. The server 130 can be configured to have access to or maintain a client program. In one embodiment, the server 130 can enable the devices in the system 100 to access the client program and/or download the client program from the server 130 or otherwise. The client program itself can be configured to present an overlay that can be superimposed onto media content presented at a device utilizing the client program. The overlay can include a timeline corresponding to the presentation of the media programming or media content. Additionally, the client program can allow users to display comments and tags on the presented media content, which can be seen amongst the users. The tags are correlated to the timeline dependent upon the media program runtime at the time at which a tag request is received.

Once the client program has received tags or comments from users commenting on the presented media content or programming, the client program can transmit the media content, tags and/or comments to the server 130 for processing. The server 130 can then be configured to determine marketing parameters of the media content based on the tags and an analysis of the metadata associated with the portion of the media programming that is tagged. For instance, the marketing parameters can include parameters corresponding to the metadata, such as music genre parameters, clothing fashion parameters, geographic parameters, video genre parameters, suggested audience age rating parameters, geographic traveling parameters, ecommerce site parameters, promotional parameters. Further, marketing parameters can also include, but are not limited to, parameters corresponding to demographic parameters, psychographic parameters, popularity parameters, and promotional effectiveness parameters, all of which can be related to the metadata of the media content or programming. The content of the comments can also be analyzed to determine marketing parameters and the effectiveness of the media content.

Additionally, the server 130 can be configured to receive requests for the media content, tags and the user-generated comments associated with the media content from the devices in the system 100, such as the recipient media device 135 and the STBs 106. Furthermore, the server 130 can relay and/or store the actual media content, tags and/or the user-generated comments associated with the media content.

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

It follows from the above illustrations that the present disclosure can apply to any present or future interactive over-the-air or landline media content services.

Figure 2:
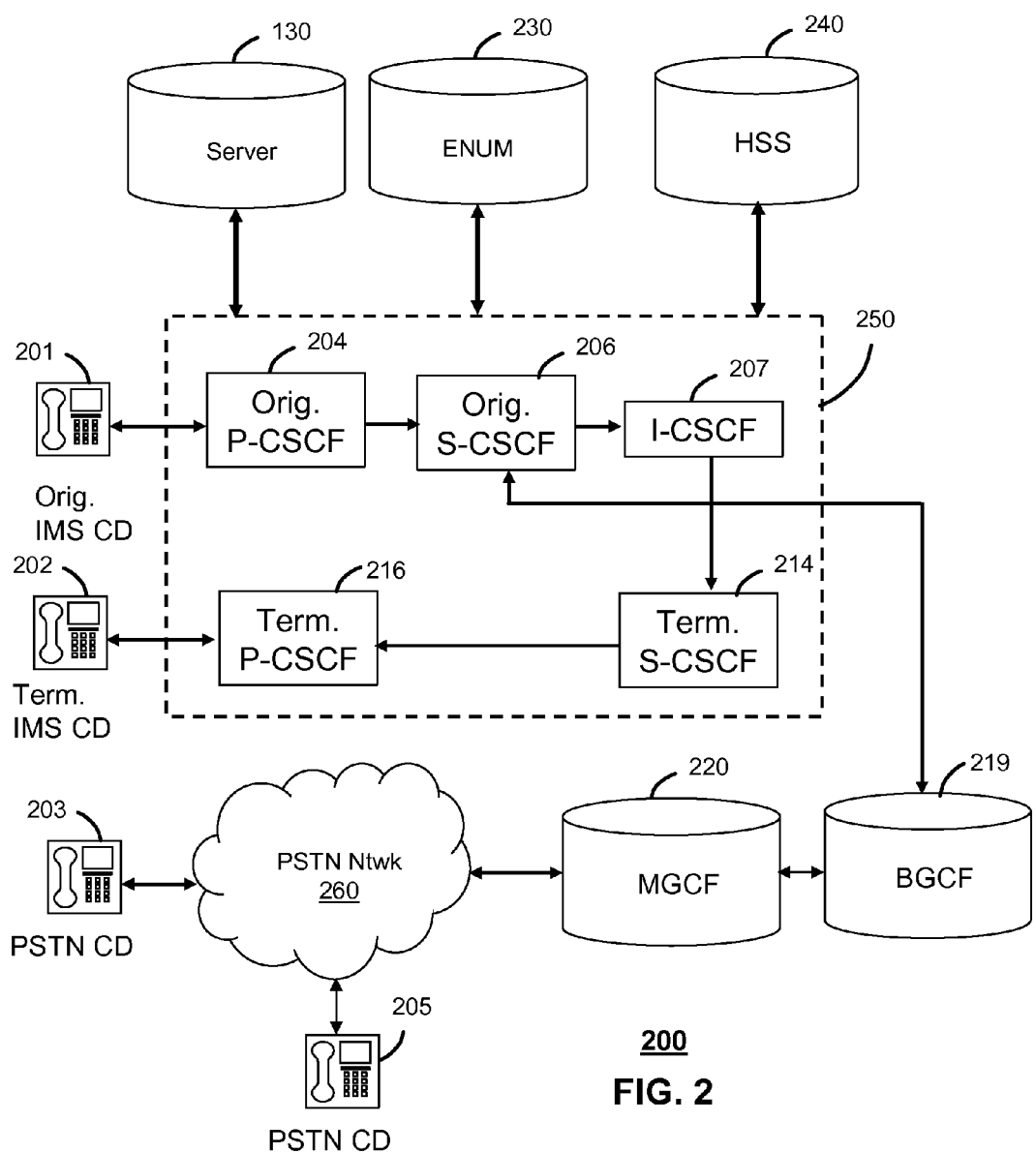

FIG. 2 depicts an illustrative embodiment of a communication system 200, employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS compliant communication devices (CD) 201, 202, Public Switched Telephone Network (PSTN) CDs 203, 205, and combinations thereof by way of a Media Gateway Control Function (MGCF) 220 coupled to a PSTN network 260.

IMS CDs 201, 202 can register with the IMS network 250 by contacting a Proxy Call Session Control Function (P-CSCF) which communicates with a corresponding Serving CSCF (S-CSCF) to register the CDs with at the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit queries to the ENUM system 230 to translate an E.164 telephone number in the SIP INVITE to a SIP Uniform Resource Identifier (URI) if the terminating communication device is IMS compliant.

The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE to the terminating S-CSCF 214. The terminating S-CSCF 214 can then identify a terminating P-CSCF 216 associated with the terminating CD 202. The P-CSCF 216 then signals the CD 202 to establish communications.

If the terminating communication device is instead a PSTN CD such as references 203 or 205, the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD by common means over the PSTN network 260.

The aforementioned communication process is symmetrical. Accordingly, the terms "originating" and "terminating" in FIG. 2 are interchangeable. It is further noted that communication system 200 can be adapted to support video conferencing by way of common protocols such as H.323. In addition, communication system 200 can be adapted to provide the IMS CDs 201, 203 the multimedia and Internet services of communication system 100.

The server 130 of FIG. 1 can be operably coupled to the second communication system 200 for purposes similar to those described above.

Figure 3:
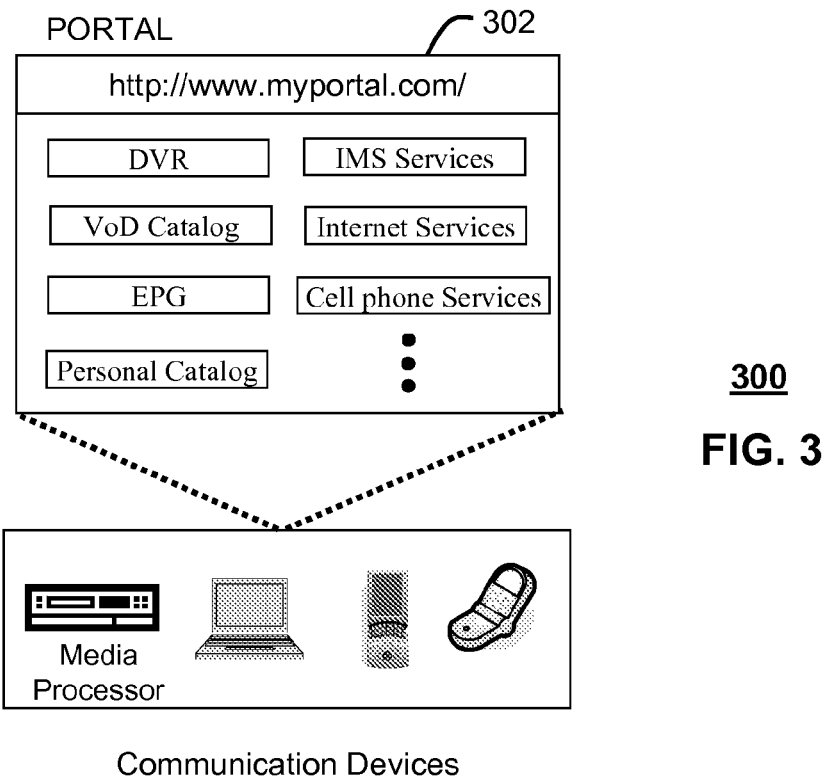
FIG. 3 depicts an illustrative embodiment of a portal interacting with the communication systems of FIGS. 1-2.

FIG. 3 depicts an illustrative embodiment of a portal 302 which can operate from the computing devices 130 described earlier of communication 100 illustrated in FIG. 1. The portal 302 can be used for managing services of communication systems 100-200. The portal 302 can be accessed by a Uniform Resource Locator (URL) with a common Internet browser such as Microsoft's Internet Explorer™ using an Internet-capable communication device such as those described for FIGS. 1-2. The portal 302 can be configured, for example, to access a media processor 106 and services managed thereby such as a Digital Video Recorder (DVR), a VoD catalog, an EPG, a personal catalog (such as personal videos, pictures, audio recordings, etc.) stored in the media processor, provisioning IMS services described earlier, provisioning Internet services, provisioning cellular phone services, and so on.

Figure 4:
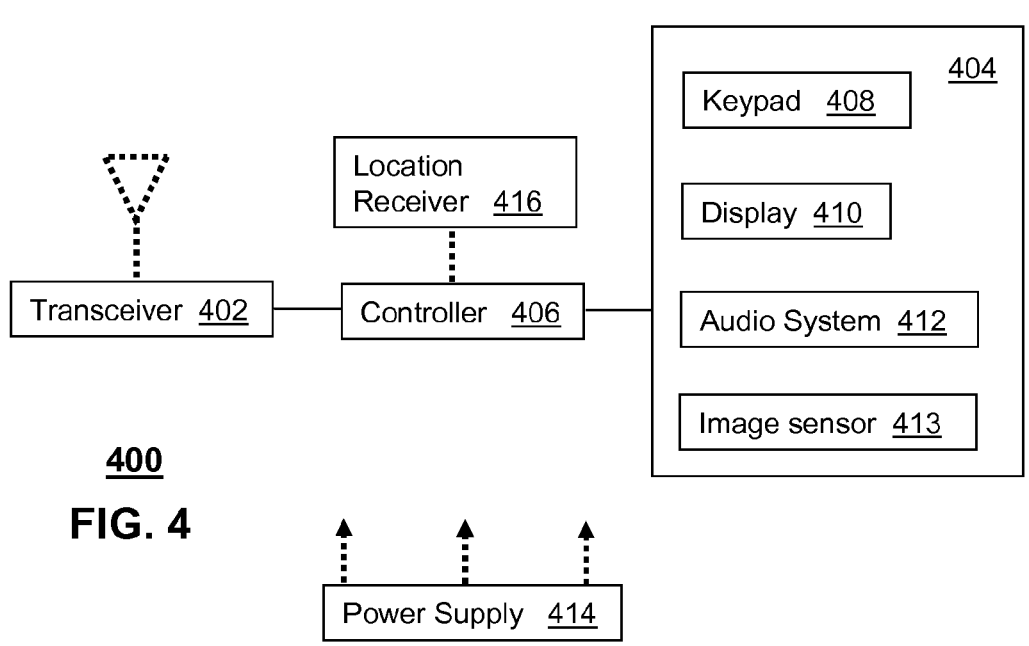
FIG. 4 depicts an illustrative embodiment of a communication device utilized in the communication systems of FIGS. 1-2.

FIG. 4 depicts an exemplary embodiment of a communication device 400. Communication device 400 can serve in whole or in part as an illustrative embodiment of the communication devices of FIGS. 1-2. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, and next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, joystick, mouse, or navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric dialing keypad commonly used by phones, and/or a Qwerty keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location receiver 416 can utilize common location technology such as a global positioning system (GPS) receiver for identifying a location of the communication device 400 based on signals generated by a constellation of GPS satellites, thereby facilitating common location services such as navigation.

The communication device 400 can use the transceiver 402 to also determine a proximity to a cellular, WiFi or Bluetooth access point by common power sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such a Flash, ROM, RAM, SRAM, DRAM or other storage technologies.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

Figure 5:
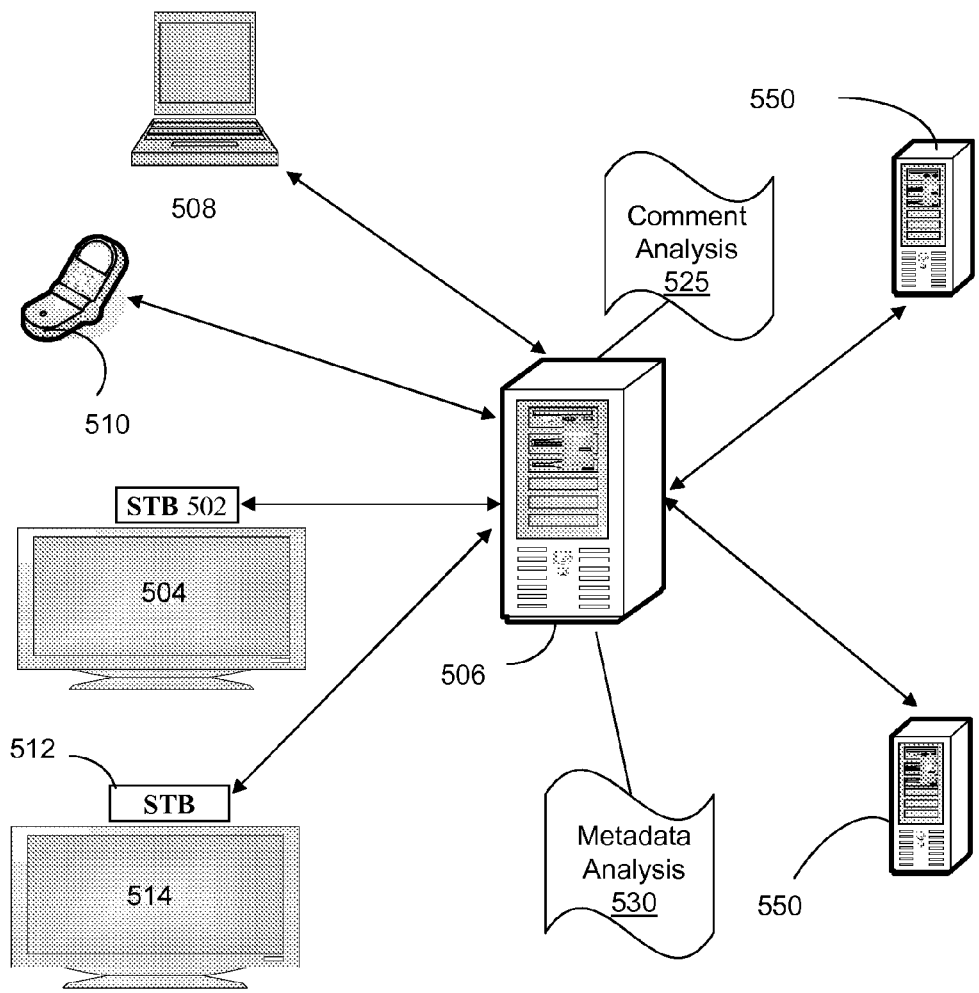
FIG. 5 depicts an illustrative embodiment of a system for managing marketing, the system operable in the communications systems of FIGS. 1-2.

FIG. 5 depicts an illustrative embodiment of a system 500 for targeted marketing, the system 500 being operable in portions of the communications systems of FIGS. 1-2. The system 500 can include a media device 502, which can be configured to deliver media content and data to display device 504. The media device 502 can be a STB, personal computer, mobile device, or other similar device. The display device 504 can be a monitor, television, cellular phones, personal digital assistants (PDA), computers, or other device capable of displaying media content. System 500 can also include a server 506. The server 506 can be in communication with the media device 502 and the other devices of the system 500. Notably, the server 506 can include or have access to a client program, which can be configured to present an overlay having a timeline that can be superimposed onto media content that is displayed and/or received at the devices in the system 500. The client program can be utilized to receive comments from users utilizing the devices in the system 500 and to transmit the comments to the server 506. While the present disclosure describes the use of a remote client program that is accessible by the media devices, the present disclosure contemplates other technique and components for presenting an overlay at a group of set top boxes so that the users of the set top boxes can experience comparable viewing at remote locations while sharing their experiences.

Additionally, the system 500 can include a computing device 508, a communications device 510, and a media device 512. The computing device 508 can be a personal computer, laptop, or other similar device. The communications device 510 can include, for example, a mobile device, a cellular phone, wireless device, or other communications device. The media device 512 can be much like media device 502 (such as a first set top box) and can be a second set top box, personal computer, mobile device, or other similar device. Also, the media device 512 can be operably coupled to a display device 514, which like display device 504, can be a monitor, television, or other display device capable of presenting media content. The devices in the system 500 can be configured to operate in an iTV network, which can include IPTV, satellite television, and cable television. Additionally, the devices in the system 500 can all be in communication with each other and the server 506 can act as an intermediary between the devices, although this does not have to be the case. Other arrangements are contemplated as well.

Operatively, when a user, such as a user of media device 502, is watching or otherwise experiencing media content presented on the display device 504, the user can utilize the client program to provide tags and/or user-generated comments related to the media content or otherwise. The media content can be a video clip, audio clip, text content, still image content, advertising content, promotional content, sampling content, or other content. For example, the user can be watching an advertisement for a car and can decide to tag the advertisement or the point or period in time at which the advertisement was displayed. When the user decides that he or she wants to tag the timeline at which the advertisement was displayed, the user can utilize the media device 502 to access the client program to request a tag. The tag will then be presented or displayed to the user at point or portion of the program timeline. As another example, the user can be watching a television show and can decide to tag a portion of the show where one of the actors is wearing a garment of interest or driving a car of interest. Again, the user decides that he or she wants to tag the timeline at the garment or car of interest was displayed, the user can utilize the media device 502 to access the client program to request a tag. The user can also include user generated information with the tag by typing or verbalizing the information and the client program can be configured to receive it.

The tags and comments that are generated at each of the set top boxes and displayed in the overlay can be utilized by the server 506 for determining advertisements, which can be presented with the overlay and the media content. Alternatively, the advertisement can be emailed to a user where the email contains a link to the goods or services or can be shown in a pop up window that displays in front of the media content and the overlay. For example, the metadata associated with the entire media content or the media program or content for the period of time along the timeline at which the tag was requested can be analyzed to determine an advertisement that is appropriate. Still further, other users can receive an email based on the tagging of media content by a single user, such a situation where users may want to know what fashion shown in a television show a certain user thought was worth tagging.

In one embodiment, metadata analysis engine 530 can be utilized to facilitate the determination of marketing parameters and/or the advertisement. The engine 530 can be resident on the server 506 and/or can be remotely accessible by the server. The engine 530 can utilize libraries, network accessible metadata databases, such as the Compact Disc Database (CDDB), the Internet Movie Database (IMDb), All Music Guide (AMG), Get Digital Data (GD3) and the like, proprietary metadata databases, language parsing and other techniques for synthesizing natural language metadata without reference to other databases. Keyword searches can also be used for determining advertisements that corresponds to the metadata. In one embodiment, marketing parameters can be determined based on analyzing the metadata and then remote media servers, such as servers 550, can be queried for particular advertisements.

In another embodiment, comment analysis engine 525 can be utilized to facilitate the determination of the advertisement. The engine 525 can be resident on the server 506 and/or can be remotely accessible by the server. The engine 525 can utilize libraries, language parsing and other techniques for synthesizing the comments. Keyword searches can also be used for determining the advertisement that corresponds to the comment. In one embodiment, marketing parameters can be determined based on the comments and then remote media servers, such as servers 550, can be queried for particular advertisements.

Figure 6:
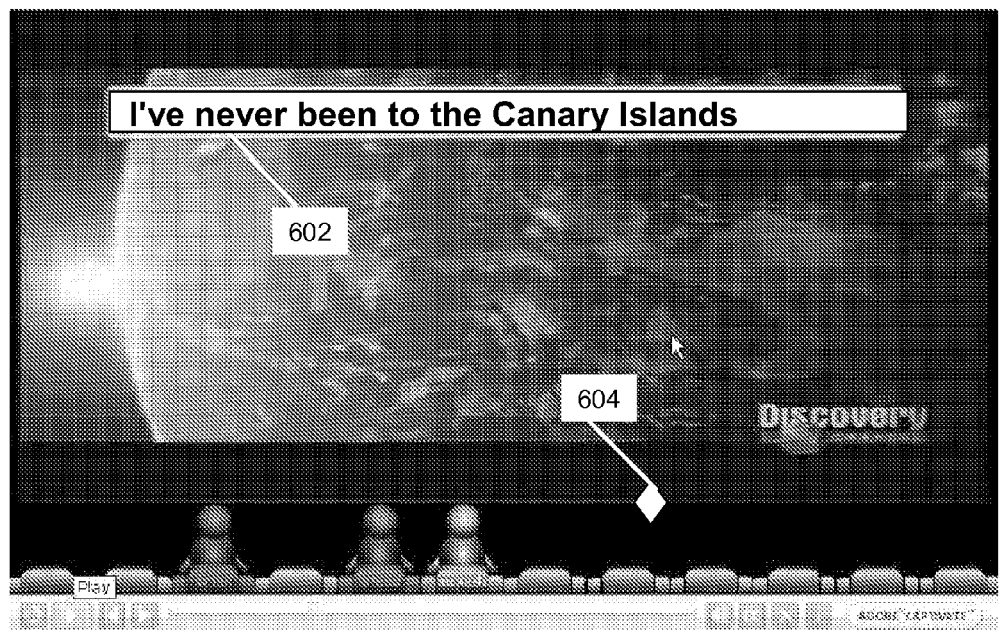
FIGS. 6-13 depict screenshots presented by a communication device of the systems of FIGS. 1-2 and 5.

Referring now also to FIG. 6, a screenshot 600 illustrating a first user of a first set top box requesting a tag and also entering a comment during the presentation of media programming or content is shown. The screenshot 600 depicts the first user who has selected an option to tag a point or period in time of the program runtime. The option presents a tag 604 along the program timeline correlated to the point in time or period in time at which the tag was requested. The tag 604 can be associated with metadata for the displayed program, such as an ecommerce website where the program or programs similar to the displayed program can be purchased. The screenshot 600 also depicts a first user who has selected an option to make a comment on the subject matter of the programming. The option presents the user with a text box 602 in which the user can type in his or her comment. This comment can be shown in this form or as a balloon text coming from the avatar of the particular user as shown in the overlay.

Figure 7:
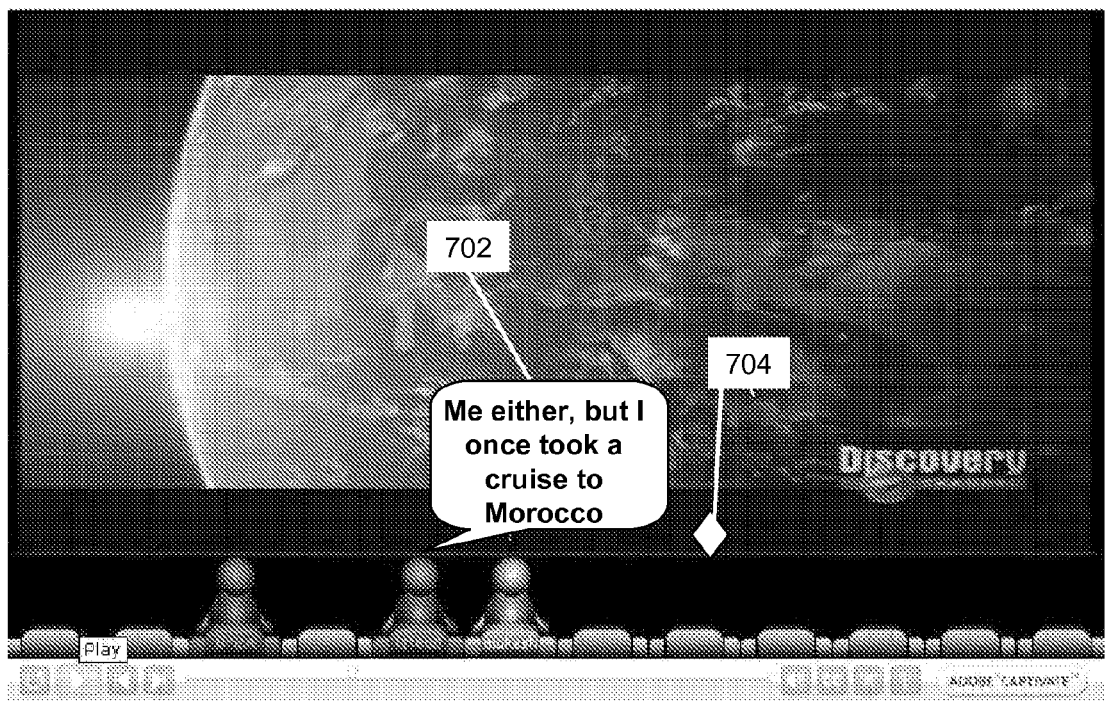

Referring now also to FIG. 7, a screenshot 700 which displays a second tag 704 and second comment by a second user at a second set top box is illustratively shown. The second tag 704 is illustrated along the program timeline correlated to the point in time or period in time at which the tag was requested. The second tag 704 can be associated with an ecommerce website that features travel services to any of the locations shown in the displayed content. Also, the screenshot 700 shows a caption box 702, which displays the captured text associated with the preview that was input by the user.

Figure 8:
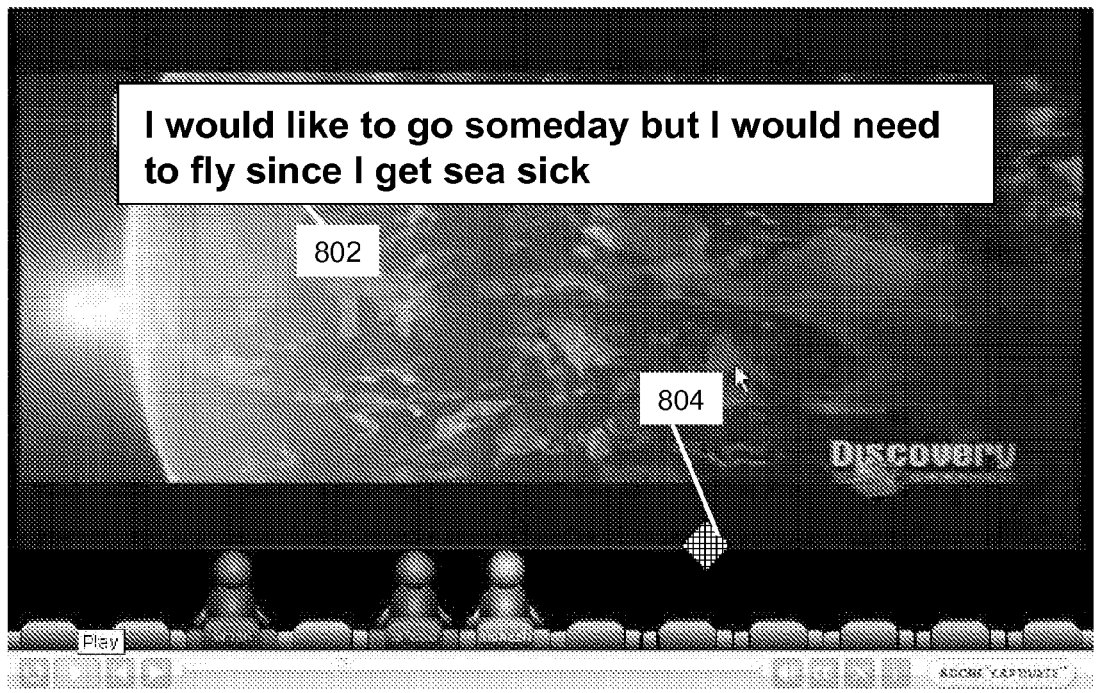

Referring now to the screenshot 800 of FIG. 8, a third tag 804 and a third comment 802 (from the first set top box) is received and presented in the overlay. The third tag 804 can be considered a personal or private tag, where the user can designate who can view the third tag 804. Accordingly, the tags and/or comments can be shown in the overlay of each of the set top boxes and/or can be shown in select overlays, such as only the overlay display to the user who requested the tag or in some overlays for authorized user or users who opted to receive such tags requested by the tagging user. For example, the third tag 804 may be viewable to only the first user or may be visible to one or more other users as selected by the user who requested the tag. The tags and comments can be associated with the particular users making the comments, such as using an overlay that resembles an audience with audience members being identified as particular users involved in the viewing of the media programming. The present disclosure also contemplates other forms of overlays being utilized and the particular design of the GUI can vary.

Once the user-generated tags are received by the client program, the client program can associate the tag with the media content, and any relevant metadata thereof, and the media device 502 can transmit the user-generated tag, metadata and/or the media content to the server 506 and or to the other devices of the system 500. Alternatively, the timing at which the tag was requested can be transmitted the metadata associated therewith can then be requested or obtained by the server 506 and or to the other devices of the system 500. User generated comments can also be transmitted separately or simultaneously with the tags.

When the server 506 receives the user-generated comment and/or other information associated with a user, the server 506 can be configured to determine marketing parameters of the media content by analyzing the metadata associated with the portion or time period of the media programming timeline that was tagged. The marketing parameters can include parameters corresponding to the metadata, such as music genre parameters, clothing fashion parameters, geographic parameters, video genre parameters, suggested audience age rating parameters, geographic traveling parameters, ecommerce site parameters, promotional parameters.

The music genre parameters can be associated with the type, style, year or other characteristics of music. The clothing fashion parameters can be associated with the sex of the wearer, style, cost, material or other characteristics of clothing or accessories. The geographic parameters can be associated with geographic location, altitude, longitude, seasonal information for geographical locations and the like. The video genre parameters can include the type, style, year, producer or other characteristics of video. The suggested audience rating parameters can include minimum age requirements or targeted age suggestions. The geographic traveling parameters can include modes of traveling transportation, season information and other information related to a geographic travel destination. The ecommerce site parameters can include user age requirements, use popularity of websites purchase products or services and the like. Promotional parameters can include any promotional offers of an advertiser or merchant.

Further, marketing parameters can also include, but are not limited to, demographic parameters, psychographic parameters, popularity parameters, and promotional effectiveness parameters, all of which can be related to the metadata of the media content or programming. The demographic parameters can be associated with the age, location, gender, race, income, and other attributes of users. Psychographic parameters can be associated with the personality, attitudes, values, lifestyle, and/or interests of the users. Popularity parameters can be utilized to indicate how popular a particular advertisement, promotion, or other media content is. Promotional effectiveness parameters can indicate how effective an advertisement or other promotion was to the user. In an embodiment, the marketing parameters can be associated with a product and/or service advertised by the media content or displayed by the media and associated with the metadata.

In the example of screenshots in FIG. 6-8, the first tag 604 and second tag 704 publicly tag a period of time at which program is displayed such that all users can see the tag. In this example, the user can have designated these tags as ecommerce type tags. Accordingly, any ecommerce relevant metadata associated with such content can include information regarding the source to purchase the program or ecommerce websites to purchase travel packages to the displayed geographic locations. Other ecommerce websites are possible. Since the tags are public, users can view other user's tags, particular other users interested in ecommerce websites associated with displayed content.

In an alternative embodiment, the first tags 604 and second tag 704 can be reminder tags. Such tags can merely mark a particular time period within a program such as video. When a user wants to view the tagged particular time period, the user can use the tag as a reminder for when the portion of the media of interest is displayed in the overall runtime of the program. The reminder tags can also function to trigger reminder emails, texts or other messages to user to review the tag and or tagged media program.

As another alternative embodiment, the first tags 604 and second tag 704 can be video and/or audio tags. Such tags can be associated with the audio and/or video metadata of the tagged period of programming. As another example, the first tags 604 and second tag 704 can be product or service tags associated with the products or services related metadata of the tagged period of programming Still further, the first tags 604 and second tag 704 can be a general commentary tag that can include use comments regarding the program and corresponding associated with metadata relevant to the user commentary. A user may use a commentary tag to discuss a certain portion of a media program with friends later and may record notes or commentary to be used for the discussion.

Figure 9:
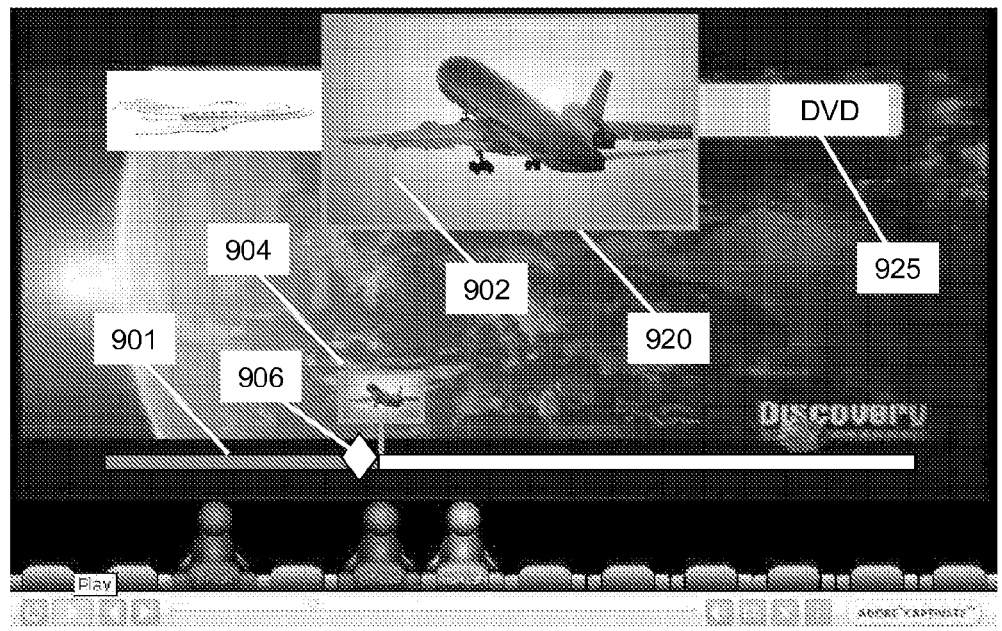

For instance, as shown in screenshot 900 of FIG. 9, a series of advertisements can be shown in an advertising GUI 902. Screenshot 900 also shows a timeline 901 that corresponds to the presentation of the media programming and tag 906 along the timeline. In this example, GUI 902 is a horizontal carousel GUI or a pop up window that allows for rotation through the various advertisements with one of the advertisements being shown more prominently as the GUI is rotated. Frame 920 of GUI 902 depicts an advertisement for traveling by air which is based on metadata associated with the tag 906, while frame 925 is an advertisement for a DVD of or related to the media programming. In this example, the subject matter of the advertisements can differ and can be presented in the same GUI carousel.

As another example, an advertisement icon 904 can be placed along the timeline 901 to correspond to the temporal position of the tag 906 and advertisement, such as if the user would like to rewind the media programming to further view the advertisement. In one embodiment, the frame 920 can provide for an Internet link to the entity providing the particular advertisement. In another embodiment, the frame 920 can be interactive such that the user can click on the advertisement or a portion thereof to receive further information (such as via an email address associated with the set top box presenting the advertisement). The advertisement icon 904 can be a generic advertisement and/or can be based on one of the advertisements that were presented in the GUI 902, such as selecting the icon based on the frame that was viewed for the longest period of time. Alternatively, an advertisement can be emailed to a user such that the email contains as link, such as a http link, to the advertised goods.

Figure 10:
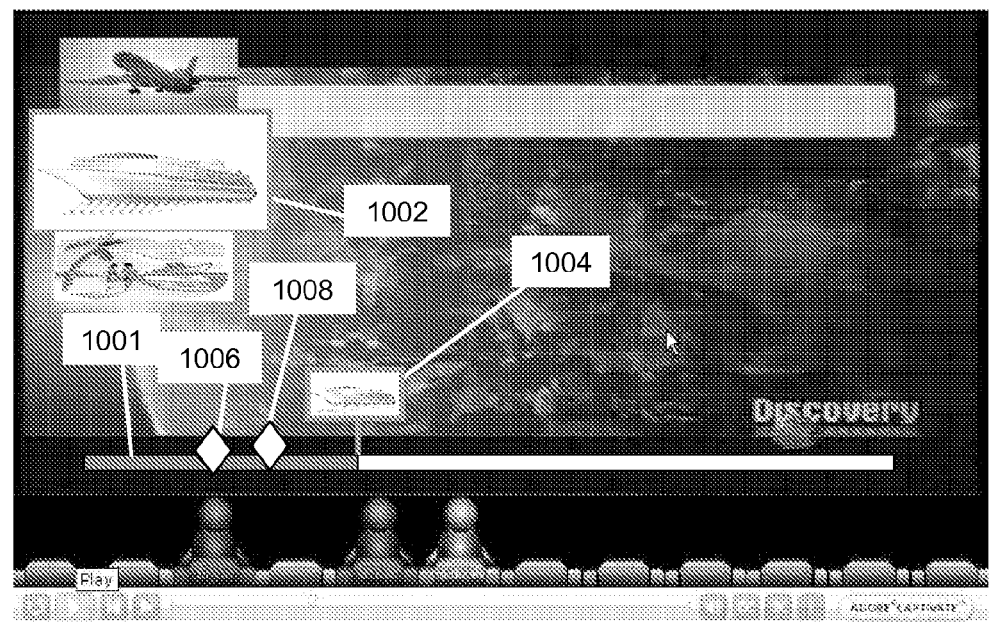

Screenshot 1000 of FIG. 10 illustrates an advertisement GUI 1002 (vertical as opposed to the horizontal GUI 902) which can be generated based on user tags 1006 and 1008. In this example, multiple advertisements are displayed based on metadata associated with the tags 1006 and 1008. Similarly, the timeline 1001 can present the advertisement icon 1004.

Figure 11:
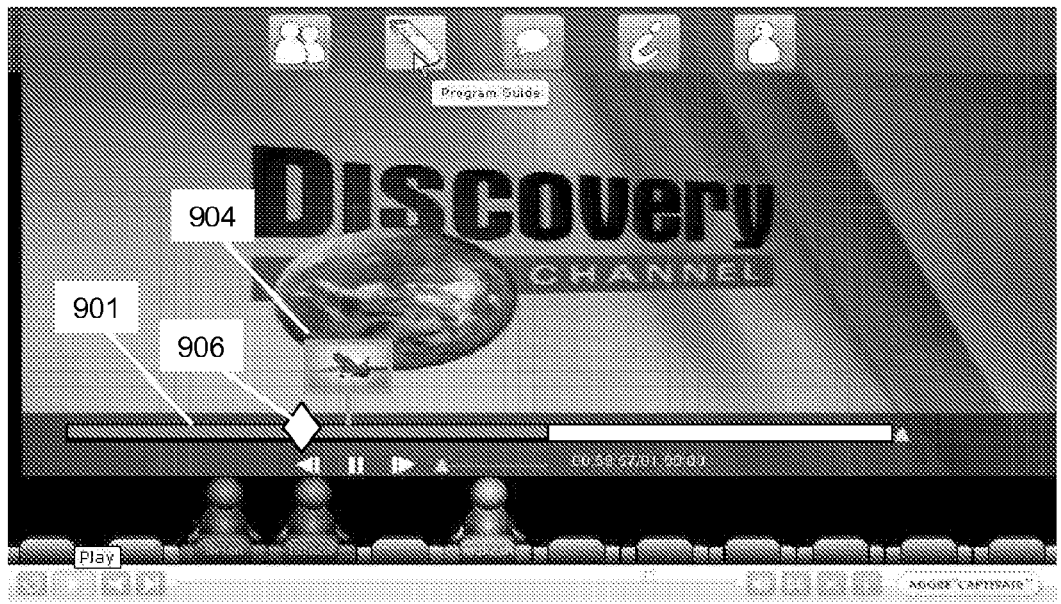
Figure 12:
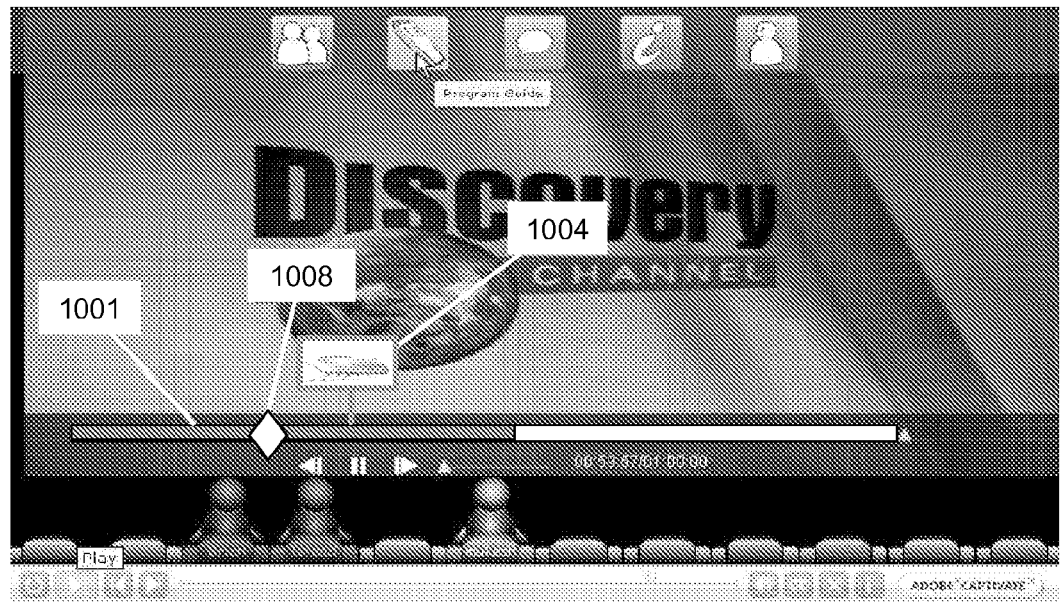
Figure 13:

As shown in screenshot 1100 of FIG. 11 and screenshot 1200 of FIG. 12, the advertisement icons 904 and 1004 facilitate referral by the user to the advertisement and the tags 906 and 1008 are correlated to the timeline of the media programming. In one embodiment, the particular advertisement shown to each set top box can be shown in the icon for that user, or, as in screenshot 1300 of FIG. 13, icons for each of the advertisements presented can be shown to all of the viewers. In one embodiment, the icons can include an indicator of the particular user to whom the advertisement was presented. In another embodiment, a link or other access to the advertisement of another user can be presented to each of the users. In such an example, other users may see advertisements generated in response to a single user tagging the media timeline so that each of the users could see the advertisements being generated for all of the users, where each individual user could access those advertisements in the event that had interest in such advertisements.

In an arrangement where a private tag is used, such as tag 804, display of the advertisement may be limited to the user who requested the tag or to a particular set of users authorized to view advertisements generated in response to a single user's request to tag the timeline. Also, the advertisements may be shown to those users who requests advertisements generated when a certain user tags a media program. In such an arrangement, tagging the timeline by a first user may result in users with a connection, such as friends or business relationship, being shown advertisements based on the tags of connected users while not displaying these advertisements to all users. Such advertisements that are already related to the metadata associated with the media programming may have a higher degree of success due to a further connection between two users.

Information regarding the frequency of user tagging, click through and purchasing rates of goods and/or services shown in the advertisements can be transmitted to server 506 for analysis. The server 506 can be configured to analyze the click through and purchasing rates, the metadata associated with the media programming, the marketing parameters and/or the content of any comments to determine the effectiveness of the media content and the advertisements. Additionally, third party users can also analyze the same information to identify successful advertisements, unsuccessful advertisements, popular media content, and/or other relevant information. The analyses can be stored by the server 506 and can be utilized to improve the media content/advertisements. The third party users can alter the media content and/or generate new substitute content if the frequency of tagging is limited or below a threshold value, if the user-generated comments indicate that a particular type of media content or advertisement was ineffective. Once the altered and/or new substitute content is generated, the server 506 can transmit the altered or substituted content to any of the devices in the system 500 for presentation. The users of the devices of system 500 can then provide comments on the altered and/or substitute content.

The devices in the system 500 can also be configured to transmit requests for the media content, tags and user-generated comments from the other devices in the system 500. For example, continuing with the above example, if a user of media device 502 has tagged the timeline of a particular media program, the users of computing device 508, communications device 510, and media device 512 can request the tag or the period of programming to which the tag is correlated from the media device 502. The comments and/or the media content from the media device 502 can also be requested. The request can be received first by the server 506, which can then retrieve the comments and/or media content from media device 502, or the devices can also directly connect to media device 502 to receive the comments and/or media content.

Once the requesting devices receive the tags, comments and/or tagged media content from the media device 502, users of the requesting devices can provide their own tags or even provide commentary on the other users' tags. Any tags generated by the requesting devices can similarly be transmitted to the server 506 or other devices of the system 500. The server 506 can also determine marketing parameters based on the metadata associated with tags coming from the requesting devices as well.

Figure 14:
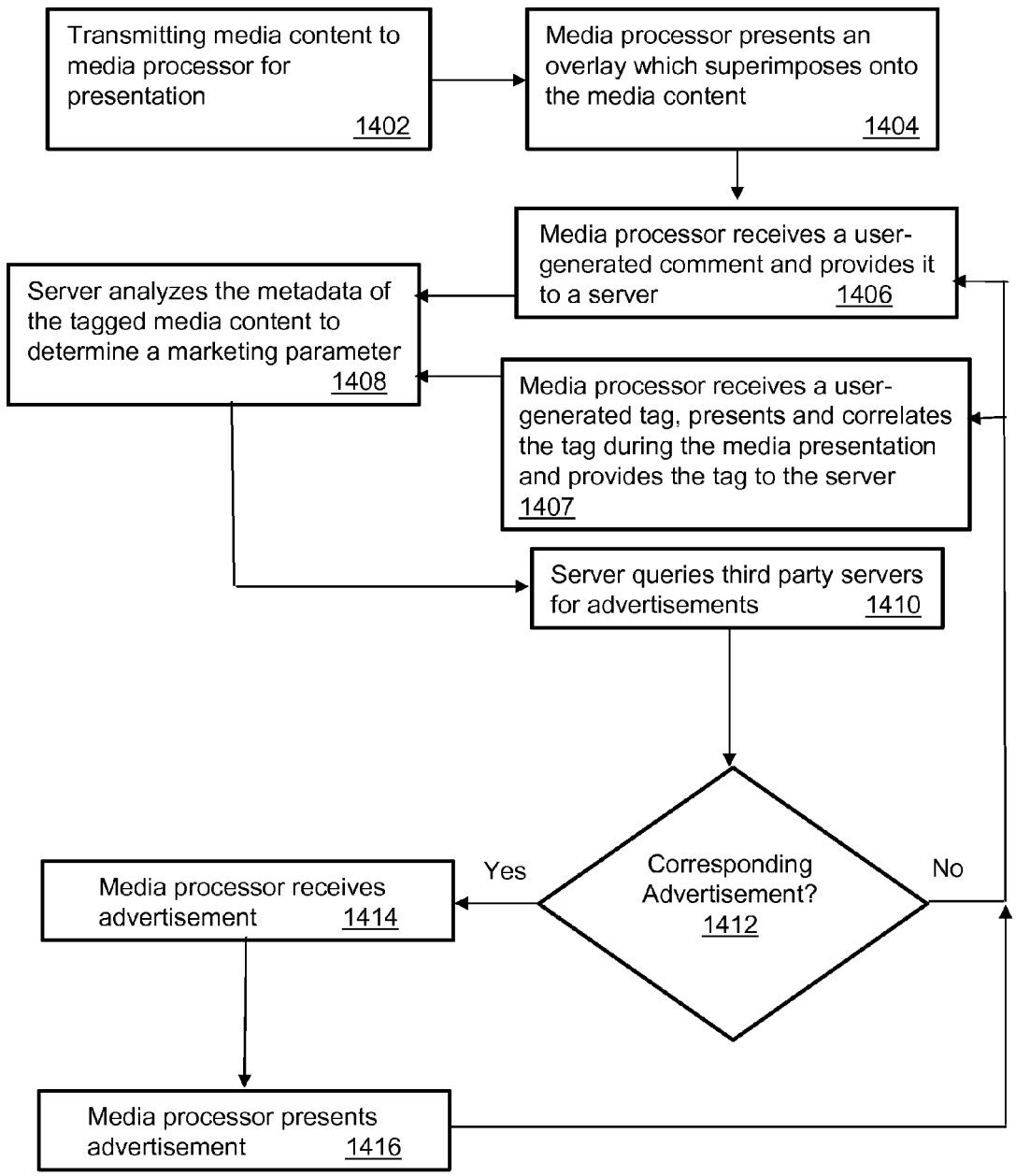
FIG. 14 depicts an illustrative embodiment of a method for managing marketing, which is operable in at least portions of one or more of the communication systems of FIGS. 1-2 and 5.

FIG. 14 depicts an illustrative method 1400 for managing marketing that is operable in portions of the communication systems of FIGS. 1-2 and FIG. 5. Method 1400 can begin with step 1402 in which media content is transmitted for presentation by a media processor, such as one or more STBs. The media content can be video content, audio content, still image content, text content, advertisement content, and/or other promotional content. For example, the media content can be a VOD movie, regularly scheduled programming, a song and so forth.

At step 1404, the media processor can present an overlay that is superimposed onto the media content. For example, the media processor can access a client program, which can present the overlay. At step 1406, the media processor can receive a user generated comment or user information, such as a comment associated with the media content. The comment can be received through use of an input interface of the client program or otherwise. The user-generated comment, for example, can indicate a user's preferences regarding the media content, a user's dislike of the media content, and a user's suggestions for improving the media content. However, the present disclosure contemplates the comments being independent of the media content being presented. In one embodiment, once the comment is received, the media processor can associate the user-generated comment with the portion of the media content, such as through use of a comment icon that is positioned along a timeline corresponding to the presentation of the media content.

At step 1407, the media processor can receive a user generated tag, such as a reminder tag, an ecommerce tag, an audio and/or video tag, a product or service tag or a general commentary tag, and the tag can be presented during the media presentation. The tag will be presented to all users if the tag is a public tag and be presented to at least the user who requested the tag and any other users authorized to view the tag, if the tag is a private tag, or users who requested to view such a tag. The tag is presented along the media presentation timeline at a point or a period in time at which the tag requested, and thus the tag is correlated to a point or a portion of the timeline.

At step 1408, the tag can be transmitted to a server. Thereafter, the metadata associated with the tagged portion of the media content timeline is analyzed to determine marketing parameters. The analysis can be performed using libraries, network accessible metadata databases, such as the Compact Disc Database (CDDB), the Internet Movie Database (IMDb), All Music Guide (AMG), Get Digital Data (GD3) and the like, proprietary metadata databases, language parsing and other techniques for synthesizing natural language metadata without reference to other databases. An example of techniques and components that can be used to process the comments to generate the marketing parameters is disclosed in U.S. patent application Ser. No. 12/502,100 filed on Jul. 13, 2009 by Rege et al., entitled "Method For Analyzing, Deconstructing, Reconstructing, And Repurposing Rhetorical Content", the disclosure of which is hereby incorporated by reference. Keyword searches can also be used for determining advertisements that corresponds to the metadata.

In step 1410, the server can obtain one or more advertisements that correspond to the comment that was received. For example, the server can query one or more third party marketing servers using the marketing parameter to obtain the advertisements. In step 1412, a determination can be made as to whether a corresponding advertisement for the marketing parameters exists and whether it should be presented. If there is no corresponding advertisement or none is to be presented then method 1400 can return to step 1407 to receive additional tags and/or return to step 1406 to receive additional comments. If on the other hand, a corresponding advertisement does exist then in step 1414 the media processor can receive the advertisement. For example, the third party server(s) can transmit a plurality of advertisements to the server where the server can select one or more of those advertisements and forward them to the media processor that generated the comment. The media processor can then present the advertisement(s) in step 1416.

The determination of advertisements to be presented to a media processor that has generated a comment can be done based on a number of factors in addition to the marketing parameter associated with the comment. For example, viewer behavior can be monitored as a factor in selecting the advertisement. For instance, the genre of programming that is watched at a particular media processor can be used as a factor in selecting the advertisement, such as a viewer that historically watches music videos may be presented with advertisements for CD or MP3 download even where the metadata associated with a tagged portion of the media programming did not include metadata related to music.

The use of the overlay allows multiple users at different locations to share in the viewing experience, including sharing tags and comments amongst each other. Based on those tags, targeted advertising can be provided to individual users or groups of users. Different advertising can be provided to different users simultaneously or in temporal proximity and/or can be provided to different users at different times. For example, a first user can receive a first set of advertisements, a second plurality of users can receive a second set of advertisements and one or more third users can receive no advertisements. In one embodiment, the presentation of advertisements can be based in part on user preferences, such as the position and style of the advertisements in the overlay and so forth.

Upon reviewing the aforementioned embodiments, it would be evident to an artisan with ordinary skill in the art that said embodiments can be modified, reduced, or enhanced without departing from the scope and spirit of the claims described below. For example, the determination of the marketing parameters can be performed by the set top box and/or the server. In one embodiment, advertising can be transmitted from the third party marketing servers directly to the set top boxes without transmitting the advertisements to the server.

In another embodiment, the server 506 and other devices of the system 500 can be configured to filter content from the comments. For example, if obscenities are found in the comments, the server 506 can filter and/or replace the obscene comments with comments that are not obscene. Additionally, the server 506 can be configured to compare comments and advertisements for multiple services and/or products and generate a report detailing which advertisements were the most effective. The report can also illustrate which demographics, psychographics, or other parameters are most responsive to a particular advertisement, whether it be positive, negative, or otherwise.

Other suitable modifications can be applied to the present disclosure without departing from the scope of the claims below. Accordingly, the reader is directed to the claims section for a fuller understanding of the breadth and scope of the present disclosure.

Figure 15:
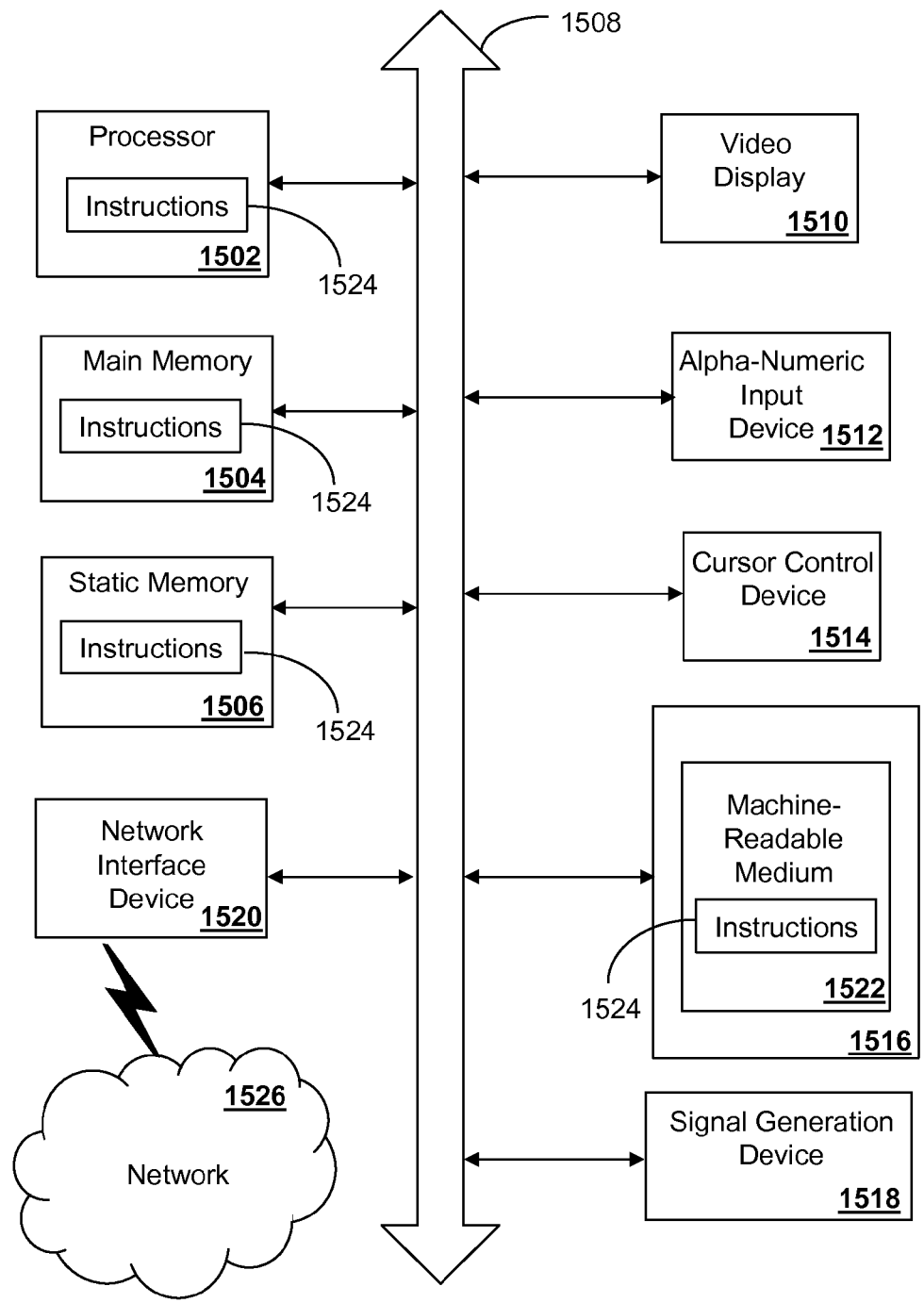
FIG. 15 is a diagrammatic representation of a machine in the form of a computer system within which a set of instructions, when executed, may cause the machine to perform any one or more of the methodologies discussed herein.

FIG. 15 depicts an exemplary diagrammatic representation of a machine in the form of a computer system 1500 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 1500 may include a processor 1502 (e.g., a central processing unit (CPU), a graphics processing unit (GPU), or both), a main memory 1504 and a static memory 1506, which communicate with each other via a bus 1508. The computer system 1500 may further include a video display unit 1510 (e.g., a liquid crystal display (LCD), a flat panel, a solid state display, or a cathode ray tube (CRT)). The computer system 1500 may include an input device 1512 (e.g., a keyboard), a cursor control device 1514 (e.g., a mouse), a disk drive unit 1516, a signal generation device 1518 (e.g., a speaker or remote control) and a network interface device 1520.

The disk drive unit 1516 may include a non-transitory machine-readable medium 1522 on which is stored one or more sets of instructions (e.g., software 1524) embodying anyone or more of the methodologies or functions described herein, including those methods illustrated above. The instructions 1524 may also reside, completely or at least partially, within the main memory 1504, the static memory 1506, and/or within the processor 1502 during execution thereof by the computer system 1500. The main memory 1504 and the processor 1502 also may constitute non-transitory machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a non-transitory machine readable medium containing instructions 1524, or that which receives and executes instructions 1524 from a propagated signal so that a device connected to a network environment 1526 can send or receive voice, video or data, and to communicate over the network 1526 using the instructions 1524. The instructions 1524 may further be transmitted or received over a network 1526 via the network interface device 1520.

While the machine-readable medium 1522 is shown in an example embodiment to be a single medium, the term "machine-readable medium" should be taken to include a non-transitory single medium or multiple media (e.g., a centralized or distributed database, and/or associated caches and servers) that store the one or more sets of instructions. The term "machine-readable medium" shall also be taken to include any non-transitory medium that is capable of storing, encoding or carrying a set of instructions for execution by the machine and that cause the machine to perform anyone or more of the methodologies of the present disclosure.

The term "non-transitory machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include anyone or more of a non-transitory machine-readable medium or a distribution medium, as listed herein and including art recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description. The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A server, comprising:
   a memory that stores instructions; and
   a controller coupled to the memory, wherein the controller, responsive to executing the instructions, performs operations comprising:
   receiving a first tag and a second tag respectively generated at a first set top box and a second set top box during presentation of media content with an overlay via the first set top box and the second set top box, the overlay including a timeline corresponding to the presentation of the media content, the first tag and the second tag respectively representing a first portion and a second portion of a runtime of the media content at which the tag was generated;
   transmitting the first tag and the second tag for display at locations on the timeline corresponding to the first portion and the second portion of the runtime;
   analyzing first metadata associated with the first portion of the runtime and second metadata associated with the second portion of the runtime;
   obtaining a first advertisement in accordance with the first metadata;
   obtaining a second advertisement in accordance with the second metadata, the first advertisement and the second advertisement having different content;
   transmitting the first advertisement and the second advertisement for display at the first set top box and the second set top box respectively;
   receiving a first user-generated comment regarding the first advertisement and a second user-generated comment regarding the second advertisement respectively generated at the first set top box and the second set top box; and
   analyzing the first user-generated comment and the second user-generated comment to determine a relative effectiveness of the first advertisement and the second advertisement.

2. The server of claim 1, wherein the server is a marketing server comprising a portion of a marketing system coupled to a media network, and wherein the media content is transmitted to the first set top box and the second set top box from a media content server separate from the marketing server.

3. The server of claim 1, wherein the operations further comprise generating a report detailing the relative effectiveness of the first advertisement and the second advertisement.

4. The server of claim 3, wherein generating the report further comprises analyzing demographic and psychographic data regarding a first user of the first set top box and a second user of the second set top box.

5. The server of claim 1, wherein the first advertisement and the second advertisement are transmitted for simultaneous display or display in temporal proximity at the first set top box and the second set top box.

6. The server of claim 1, wherein the first advertisement and the second advertisement are transmitted for display at different times at the first set top box and the second set top box.

7. The server of claim 1, wherein the first tag and the second tag are both displayed at the first set top box and at the second set top box.

8. The server of claim 1, wherein the first user-generated comment and the second user-generated comment are both displayed at the first set top box and the second set top box.

9. The server of claim 1, wherein the first metadata and the second metadata are associated with a first product and a second product respectively, a first product image is shown in the overlay presented at the first set top box, and an second product image is shown in the overlay presented at the second set top box.

10. The server of claim 9, wherein a first icon associated with the first product is placed on the timeline presented at the first set top box, and a second icon associated with the second product is placed on the timeline presented at the second set top box.

11. A method, comprising:
   receiving, by a server comprising a processor, a first tag and a second tag respectively generated at a first set top box and a second set top box during presentation of media content with an overlay via the first set top box and the second set top box, the overlay including a timeline corresponding to the presentation of the media content, the first tag and the second tag respectively representing a first portion and a second portion of a runtime of the media content at which the tag was generated, the media content being provided by a media content server separate from the server;
   transmitting, by the server, the first tag and the second tag for display at locations on the timeline corresponding to the first portion and the second portion of the runtime;
   obtaining, by the server, a first advertisement associated with the first tag and a second advertisement associated with the second tag, the first advertisement and the second advertisement having different content;

transmitting, by the server, the first advertisement and the second advertisement for display at the first set top box and the second set top box respectively;

analyzing, by the server, demographic and psychographic data regarding a first user of the first set top box and a second user of the second set top box; and generating, by the server, a report detailing a relative effectiveness of the first advertisement and the second advertisement.

12. The method of claim 11, further comprising receiving a first user-generated comment regarding the first advertisement and a second user-generated comment regarding the second advertisement respectively generated at the first set top box and the second set top box, and wherein generating the report comprises analyzing the first user-generated comment and the second user-generated comment.

13. The method of claim 12, wherein the first user-generated comment and the second user-generated comment are both displayed at the first set top box and the second set top box.

14. The method of claim 11, wherein the first advertisement and the second advertisement are transmitted for simultaneous display or display in temporal proximity at the first set top box and the second set top box.

15. The method of claim 11, wherein the first advertisement and the second advertisement are associated with a first product and a second product respectively, a first product image is shown in the overlay presented at the first set top box, and a second product image is shown in the overlay presented at the second set top box.

16. The method of claim 11, wherein the server comprises a marketing server separate from the media content server.

17. A non-transitory machine-readable storage device of a marketing system, comprising instructions which, when executed by a processor, cause the processor to perform operations comprising:

receiving a first tag and a second tag respectively generated at a first set top box and a second set top box during presentation of media content with an overlay via the first set top box and the second set top box, the overlay including a timeline corresponding to the presentation of the media content, the first tag and the second tag respectively representing a first portion and a second portion of a runtime of the media content at which the tag was generated;

transmitting the first tag and the second tag for display at locations on the timeline corresponding to the first portion and the second portion of the runtime;

analyzing first metadata associated with the first portion of the runtime and second metadata associated with the second portion of the runtime;

obtaining a first advertisement in accordance with the first metadata;

obtaining a second advertisement in accordance with the second metadata, the first advertisement and the second advertisement having different content;

transmitting the first advertisement and the second advertisement for display at the first set top box and the second set top box respectively, the first advertisement and the second advertisement associated with a first product and a second product respectively;

transmitting a first product image for display in the overlay presented at the first set top box; and transmitting a second product image for display in the overlay presented at the second set top box.

18. The non-transitory machine-readable storage device of claim 17, wherein the operations further comprise:

analyzing demographic and psychographic data regarding a first user of the first set top box and a second user of the second set top box; and generating a report detailing a relative effectiveness of the first advertisement and the second advertisement.

19. The non-transitory machine-readable storage device of claim 18, wherein the operations further comprise receiving a first user-generated comment regarding the first advertisement and a second user-generated comment regarding the second advertisement respectively generated at the first set top box and the second set top box, and wherein generating the report comprises analyzing the first user-generated comment and the second user-generated comment.

20. The non-transitory machine-readable storage device of claim 17, wherein the media content is transmitted to the first set top box and the second set top box from a media content server separate from the marketing system.

* * * * *